United States Patent [19]
Albright et al.

[11] 3,884,671
[45] May 20, 1975

[54] HERBICIDAL N-HALOACYL (2-ALKYLATED) OXAZOLIDINES

[75] Inventors: James A. Albright, St. Louis, Mich.; Kenneth P. Dorschner, Vienna, Va.

[73] Assignee: SCM Corporation, New York, N.Y.

[22] Filed: July 27, 1973

[21] Appl. No.: 383,349

Related U.S. Application Data

[62] Division of Ser. No. 280,851, Aug. 15, 1972.

[52] U.S. Cl. .................................. 71/88; 260/307 F
[51] Int. Cl. ............................................. A01n 9/22
[58] Field of Search ........................................ 71/88

[56] References Cited
UNITED STATES PATENTS

| | | | |
|---|---|---|---|
| 3,221,021 | 11/1965 | Hickner | 71/88 |
| 3,707,541 | 12/1972 | Lajiness | 260/244 R |

Primary Examiner—Lewis Gotts
Assistant Examiner—Catherine L. Mills
Attorney, Agent, or Firm—A. Joseph Gibbons; Merton H. Douthitt

[57] ABSTRACT

N-haloacyl oxazolidines mono or dialkylated with $C_{1-12}$ alkyl groups at the 2-position and with $C_{1-8}$ alkyl groups in the 4 and 5 positions of the oxazolidine ring have been found to be selective herbicides for the protection of crop plants.

6 Claims, No Drawings

HERBICIDAL N-HALOACYL (2-ALKYLATED) OXAZOLIDINES

This is a division of application Ser. No. 280,851 filed Aug. 15, 1972.

BACKGROUND OF THE INVENTION

This invention relates to substituted oxazolidines and more particularly to N-haloacyl (2-alkylated) oxazolidines, herbicidal compositions containing same, and a process for controlling plant growth with same. The closest art known to applicants is listed in attached Form PO-1082.

The oxazolidine ring is a 5-member carbocyclic ring having an oxygen atom at the one position and a nitrogen atom at the three position, thus:

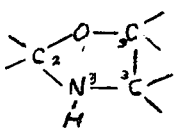

Various derivatives heretofore have been suggested for use as herbicides, insecticides, microbiocides, microbiostats, and pharmaceuticals.

SUMMARY OF THE INVENTION

One aspect of this invention is an N-haloacyl (2-alkylated) oxazolidine wherein the haloacyl group is $C_{2-4}$ acyl and the 4 and 5 carbon atoms of the oxazolidine ring are satisfied by hydrogen atoms or $C_{1-6}$ alkyl groups.

Another aspect of this invention is a herbicidal composition comprising about 1–98 percent of such oxazolidine and an agriculturally acceptable carrier therefor.

Still another aspect of this invention is a process for controlling growth of vegetation which comprises applying to the locus of such vegetation such oxazolidine at the rate of about 0.5–15 pounds per acre.

The subject compounds can be depicted structurally as follows:

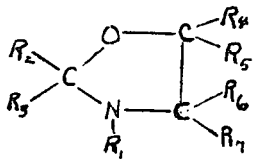

$R_1$ is a $C_{2-4}$ haloacyl group, e.g., chloroacetyl.
$R_2$ is a $C_{1-12}$ alkyl group.
$R_3$ is a $C_{1-12}$ alkyl group or hydrogen.
$R_4$, $R_5$, $R_6$, and $R_7$ are hydrogen atoms or lower ($C_{1-6}$) alkyl groups.

The haloacyl group of the oxazolidine nitrogen atom is of special importance for achieving herbicides effectiveness. For efficiency and economy the advantageous haloacyl groups are chlorinated, preferably monochlorinated, but multiple halogenation can be practiced, and the halogen also can be bromine iodine and/or fluorine. Additionally, such haloacyl group advantageously is haloacetyl for efficiency and economy, but halopropionyl and halobutyryl radicals (normal and isomeric) also can be used.

In general, for efficiency and economy of preparation and general herbicidal use the alkylation on the 2-carbon atom of the oxazolidine ring advantageously is at least one $C_{1-12}$ straight or branched chain alkyl group, frequently two alkyl groups (in such instances often unsymmetrical alkylation), and especially lower ($C_{1-6}$) alkylation. It is, of course, within the skill of the art to replace at least such higher molecular weight alkyl radicals with alkenyl radicals, or even the propyl radical with an allyl radical or to replace hydrogen atoms on any such hydrocarbyl group with halogen, carbontrile, nitro, alkoxy, mercapto, amido, ester, thioester, and hydroxy groups.

In general, we have found that the most herbicidally effective of the instant compounds are those having alkylation on the 4 or 5 carbon atoms of the oxazolidine ring, particularly those having plural alkylation of the 4 carbon atom, especially when such alkyl group or groups are low in carbon atoms, e.g., methyl, ethyl, or propyl and particularly methyl. Surprising herbicidal selectivity has been found, for example, for the control of crabgrass even when there is no alkylation at the 4 and 5 position. When the 4 and 4 and 5 positions are alkylated, however, greater control of a larger number of undesirable weeds amongst crop plants such as corn, soybean, and cotton is noted.

Also, surprisingly, while many of the subject compounds are useful for post-emergent selective herbicides, some, as will be shown, can be applied pre-emergently to the plant locus, and some even soil-incorporated with effectiveness for weed control.

Application dosages of these herbicides, based on the active ingredient, suitably can be fairly high, but for economy generally are about 15 pounds per acre or below, advantageously not more than about 8 pounds per acre, and generally 0.5–8 pounds per acre, although dosages as high as 40 pounds per acre can be used.

By crop plants is meant not only agricultural crops which are used for food supply of man and animals, but also includes other plants such as lawn grass species where broad leaf and other undesirable weeds are to be controlled, suppressed, or eradicated.

In general, oxazolidines of this invention are effective in the elimination or control of weeds including coffeeweed (*Sesbania*, spp.), pigweed (*Amaranthus*, spp.), crabgrass (*Digitario*, spp.), barnyard grass (*Echinochloa*, spp.), without significant injury to the specific crops such as corn, cotton, peanuts, and soybeans.

Conventional formulations can be used to apply these herbicides using the conventional agriculturally acceptable carriers inert towards the subject oxazolidine, not harmful to the operator or the environment of the plant. Hence, intermediates, unreacted excess reactants or reagents, by-products of reaction, and solvents containing such extraneous chemical material definitely are not a part of the inventive compositions, the latter whose active ingredients should be fairly commercially pure compounds, e.g., 85 percent purity or higher with only innocuous diluents admixed with them.

Applications as wettable powders dispersed in an aqueous medium are preferred when the oxazolidine is relatively insoluble in the application solvent. Wettable powders can be formulated from inert carriers such as clays, talc, diatomaceous earth and other siliceous inorganic solids and silicates. Although the wettable powder can contain any proportion of active herbicides from about 1 to 98 percent, it is generally more economically feasible to use a high loading of active selective herbicide material. Active ingredient concentrations of 50–90 percent based on weight of inert carrier is recommended, and concentrations roughly of 80 weight percent active ingredient are preferred. It is desirable that both the inert carrier and herbicide, if solids, be ball-milled or ground by other common techniques to a very fine state of subdivision so that they will pass through a 325-mesh screen (U.S. Standard Sieve).

The formulation can contain various other agents to wet, disperse, and emulsify the herbicidal composition whether or not a solvent is used in the application to the locus of the plant or to the soil. The surfactants or other detergents employed can be anionic, nonionic, or cationic as are detailed in McCutcheons 1969 publication on *Detergents and Emulsifiers*. Surfactants useful in formulation of our selective herbicides, are usually added in amounts of 1 to 10 percent based on the total weight of wettable powder formulation but generally in the order of 2 percent. These can be alkyl and alkylaryl polyether alchols, polyoxyethylene sorbitols, or sorbitan fatty acid esters, alkylaryl sulfonates, long chain quaternary ammonium chlorides, and the like.

For certain pre-emergence or soil-incorporated applications the active oxazolidine is best applied in a powder or granular form using inert clays or talcs and the like as the carrier. These granular formulations tend to prolong the activity of the herbicide by controlling its release into the soil.

Water emulsions may be prepared with the aid of emulsifiers such as triethanolamine stearate, sodium lauryl sulfonate sodium alkyl naphthalene sulfonate, sodium oleate, p-t-octylphenoxy-polyethoxy ethanol, as well as other well-known emulsifiers.

The characteristic of a good selective herbicide is that when it is applied near or on the foliage of the crop plant, only the weed species is killed while the valuable crop plants are not harmed beyond the point of recovery, thus allowing a high percentage (85–100 percent) to mature to harvestable crops.

We have found the following compounds representative of the types most efficacious as selective herbicides:

3-(α-chloroacetyl)-2-pentyl-4,4-dimethyl-oxazolidine 3-(α-chloroacetyl)-2-(2', 6'-dimethylheptyl)-4,4-dimethyl-oxazolidine 3-(α-chloroacetyl)-2-propyl-2,5-dimethyl-oxazolidine 3-(α-chloroacetyl)-2-propyl-2,4,4-trimethyl-oxazolidine

SYNTHESIS

The unacylated oxazolidine intermediates for preparing the subject compounds can be synthesized conveniently by reacting substituted amino alkanols with ketones. A substantial list of these compounds is given in the review article "The Oxazolidines", E. D. Bergman, Chem. Rev., 53, 309 (1953). Usually, the amino alcohol and the ketone are heated together in an inert hydrocarbon solvent, and by-product water is separated from the condensed azeotropic mixture of hydrocarbon and water in a Dean-Stark water separator. The solvent is then evaporated and the product purified by distillation under reduced pressure. Suitable reaction solvents are water immiscible hydrocarbons such as benzene, toluene and the like. A preferred solvent is benzene because of its low boiling point.

The N-haloacyl oxazolidines of this invention can be synthesized by reacting the corresponding intermediate oxazolidine with the desired haloalkylcarbonyl chloride (also described as a haloacyl chloride) at a temperature in the range of about 50° C. to about 250° C. in the presence of an acid-acceptor. The reaction is preferably carried out in an organic solvent, inert under the conditions of the reaction as for example, acetonitrile, benzene, xylene and the like; hydrocarbon solvents are generally preferred. The acid-acceptor is generally a basic substance which forms water soluble by-products, easily separable from the main reaction product. Although the acid-acceptor can sometimes be alkali metal salts of weak acids, such as sodium or potassium carbonate, or acetate, it is preferable to use a tertiary amine. Useful and common tertiary amines are, for example, triethylamine and pyridine; frequently the crystalline hydrohalide formed as a by-product is insoluble in the reaction solvent and easily removed by filtration. When a hydrocarbon solvent is used the product is frequently completely soluble in the reaction solvent and workup is conveniently carried out by filtering the by-product amine hydrohalide, washing the remaining organic phase with water, and removing the reaction solvent by evaporation or distillation. Thereafter, the product can usually be purified by conventional distillation procedures including ones at subatmospheric pressure.

The following examples are intended to illustrate the invention but not to limit the scope thereof, parts and percentages being by weight unless otherwise indicated.

EXAMPLE 1

3-(α-chloroacetyl)-2-(propyl)-2,4,4-trimethyl-oxazolidine

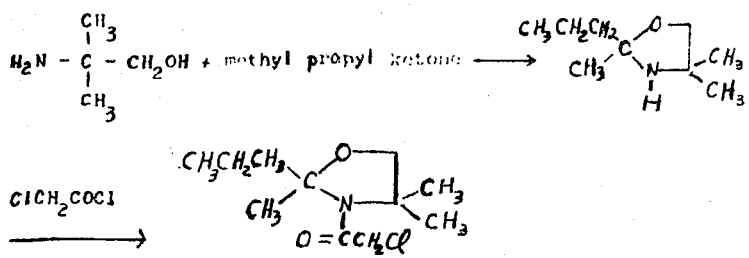

Methyl propyl ketone (17.2 g.) was added to 2-methyl-2-amino-1-propanol (17.8 g.) dissolved in 100 ml. benzene and the mixture was stirred and refluxed collecting the water from the condensed azeotropic distillate using a Dean-Stark water separator. After the theoretical amount of water had been collected, triethlamine (20 g.) was added and a solution of oxazolidine chloride (22.6g.) in 60 ml. benzene was added dropwise with stirring over a period of 1 hour. An exothermic reaction developed and stirring was continued overnight. The desired N-chloroacetyl oxazolidine was isolated in 20 percent yield of estimated purity of 95% as determined by VPC analysis.

In a manner similar to that of Example 1, the following compounds were synthesized using the indicated aldehyde or ketone and the indicated amine in place of the 2-methyl-2-amino-1-propanol and the methyl propyl ketone used in Example 1:

plished by application of the chemical to exposed seeds before covering with fresh untreated soil.

Candidate oxazolidines were dissolved in acetone and diluted with water.

One carrying tray each of pre-emergence (6 crops and 6 weeds) and post-emergence (6 crops and 6 weeds) containers, mounted on a conveyor belt of 1.5 m.p.h. linear speed, tripped a microswitch which in turn activated solenoid valve and released treatment. Candidate compounds were discharged with pressure as sprays. The treated trays were removed to the greenhouse and held for observation.

| EXAMPLE NO. | OXAZOLIDINE PRODUCT | STARTING AMINO ALCOHOL | STARTING ALDEHYDE OR KETONE |
|---|---|---|---|
| 2 | 3-($\alpha$-chloracetyl)-2-(n-pentyl)-4,4-dimethyl-oxazolidine | A | n-hexanal |
| 3 | 3-($\alpha$-chloroacetyl)-2-(2',6'-dimethylheptyl)-4,4-dimethyl-oxazolidine | A | 2,6-dimethyloctanal |
| 4 | 3-($\alpha$-chloroacetyl)-2-propyl-2,5-dimethyl oxazolidine | B | methyl propyl ketone |
| 5 | 3-($\alpha$-chloroacetyl)-2,2-diethyl-4,4-dimethyl-oxazolidine | A | diethyl ketone |
| 6 | 3-($\alpha$-chloroacetyl)-2-2-dipropyl-4,4-dimethyl oxazolidine | A | dipropyl ketone |
| 7 (control) | 3-(-N-methylcarbamyl)-2-propyl-2,4,4-trimethyl-oxazolidine* | A | methyl propyl ketone |
| 8 (control) | 3-(-N-p-chlorophenylcarbamyl)-2-propyl-2,4,4-trimethyl-oxazolidine** | A | methyl propyl ketone |

*In the preparation methyl isocyanate was used instead of chloroacetyl chloride.
**p-chlorophenyl isocyanate was used instead of chloroacetyl chloride.
A 2-amino-2-methyl-1-propanol
B 1-amino-2-propanol

EXAMPLE 9

Each experimental candidate pesticide was formulated to assure substantially uniform broadcast of 8.0 pounds active ingredient (candidate) per acre. The resulting compositions were then evaluated as pre-emergence, post-emergence and as soilincorporated herbicides.

In the pre-emergence herbicidal testing, typical crop plant and weed species were seeded in individual flats, watered in amounts adequate to moisten soil and held for 24 hours before treatment. Candidate chemicals were then applied to the soil surface of flats, taking care to assure that no seedlings had emerged from the soil before chemical treatment.

In post-emergence herbicidal testing, appropriate crop plant and weed species were seeded in individual disposable flats, watered as required and maintained under greenhouse conditions. When all crop plants and weeds had reached suitable growth development, generally the first true leaf stage of the slowest plants, containers of plants appropriate to pertaining test requirements were selected for uniformity of growth and development. A 4-inch container of each plant and weed, averaging 6 (corn) to 50(crabgrass) or more plants or weeds per individual container was then placed on carrying tray for treatment. Ordinarily, 6 crop and 6 weed containers were used in each evaluation.

Soil-incorporation is primarily an attempt to reduce loss of chemical by volatility and/solar degradation. In this screening program, soil-incorporation was accomplished Reference standard sterile flats and untreated containers received similar care and handling.

Pre-emergence and post-emergence treatments were observed daily for interim response, final observations being made 14 days after treatment. Any treatments including questionable response were held beyond the 14-day observation period until such response was confirmed. Observations included all abnormal physiological responses of stem bending, petiole curvature, epinasty, hyponasty, retardation, stimulation, root development, necrosis, chloresis, and related growth regulant characteristics.

Evaluation of the herbicidal performance of the experimental compounds was made by comparison of plant stands in the treatment with those found in untreated controls.

Where complete kill (100% control) of a plant species was not obtained, herbicidal performance is indicated by two methods. The first is a numerical rating 0 to 100 and represents percent of the plants actually killed at the time of observation. A second indication of herbicidal performance was a vigor rating ($a$ to $d$) indicated in the Table as exponents which indicates the general health and appearanc of the plants after the chemical treatment.

The vigor ratings are as follows:

a. Severe Injury — Plants will eventually die
b. Moderate Injury — Plants may or may not recover
c. Moderate Injury — Plants will recover
d. Slight Injury — Plants only slightly behind control
No Exponent — Plants similar to untreated control Thus, a chemical having a rating of $0^a$ on a barnyard grass is nearly as effective as another chemical providing 100 percent kill of this weed. In the Table, where there was no plant injury, the rating 0 with no exponent is recorded. Where the percent kill was 50 percent or below, the appropriate exponent indicating plant injury was used. Where the percent kill exceeded 50 percent, no such exponent rating is shown.

The N-haloacyl oxazolidines having alkylation at the 2-position of the oxazolidine ring, as shown in Examples 1, 2, 3, 4, and 5, were treated as pre-emergence, post-emergence, and soilincorporated herbicides. The controls used in this testing were analogs of the compounds of this invention but differed in that, instead of having N-haloacyl radicals in the 3-position of the ring, the 3-position nitrogen was substituted with an N-methylcarbamyl and an N-(p-chlorophenyl) carbamyl radical. These controls are described in Examples 7 and 8.

The results shown in Table I indicate the importance of the halogen substitution in the above-mentioned acyl radical attached to the oxazolidine ring nitrogen. The compounds with haloacyl substitution exhibit herbicidal activity whereas the control compounds without such haloacyl substitution were inactive, against all the species of plants and weeds than when there is unsymmetrical dialkylation at the 2-position. Surprisingly, when this 2-position symmetry is not present, superior herbicidal activity results as shown by the compounds of Example 2 (mono-substituted at the 2-position with an n-pentyl radical) and Example 4 (methyl and propyl substitution at the 2-position). The similarly unsymmetrical compound of Example 1 is especially selective toward cotton as a pre-emergence herbicide while controlling barnyard and crabgrass.

TABLE I

N-HALOACYL (2-ALKYLATED) OXAZOLIDINES

| | Application Type | lbs/acre | Millet | Soybean | Coffee Weed | Rice | Pigweed | Corn | Crabgrass | Cotton | Barnyard Grass |
|---|---|---|---|---|---|---|---|---|---|---|---|
| Example 1 | Pre | 8 | $50^c$ | 0 | $0^a$ | 0 | $0^d$ | 0 | 100 | 0 | $9^a$ |
| | S.I. | 8 | $0^a$ | 0 | $0^d$ | $0^c$ | 0 | 0 | $25^b$ | 0 | $0^b$ |
| | Post | 8 | $0^d$ | $0^d$ | $50^c$ | $0^d$ | $0^c$ | 0 | $30^b$ | $0^d$ | $0^c$ |
| Example 2 | Pre | 8 | 0 | 0 | 0 | 0 | $0^d$ | 0 | 0 | 0 | 0 |
| | S.I. | 8 | 0 | 0 | 0 | 0 | 0 | 0 | 0 | 0 | 0 |
| | Post | 8 | 0 | $0^d$ | 100 | 0 | 100 | $0^d$ | $50^c$ | 100 | 0 |
| Example 5 | Pre | 8 | 0 | 0 | 0 | $0^a$ | 0 | 0 | $0^c$ | 0 | $0^d$ |
| | S.I. | 8 | 0 | 0 | 0 | $0^d$ | 0 | 0 | $0^d$ | 0 | $0^c$ |
| | Post | 8 | 0 | 0 | $0^c$ | 0 | $0^d$ | 0 | $0^d$ | 0 | $0^c$ |
| Example 6 | Pre | 8 | 0 | 0 | $0^d$ | 0 | $0^c$ | $0^d$ | $0^d$ | 0 | 0 |
| | S.I. | 8 | 0 | 0 | 0 | 0 | 0 | 0 | 0 | 0 | 0 |
| | Post | 8 | 0 | 0 | $0^d$ | 0 | $0^c$ | $0^d$ | $0^c$ | 0 | $0^d$ |
| Example 4 | Pre | 8 | 75 | 0 | $0^d$ | 0 | 0 | 0 | 100 | 0 | 75 |
| | S.I. | 8 | $0^c$ | 0 | $0^d$ | $0^d$ | 0 | 0 | $0^c$ | 0 | $15^b$ |
| | Post | 8 | $0^d$ | $0^c$ | 60 | 0 | $0^d$ | 0 | $0^d$ | $0^b$ | $25^c$ |
| Example 3 | Pre | 8 | 0 | 0 | 0 | 0 | 0 | 0 | 0 | 0 | 0 |
| | S.I. | 8 | 0 | 0 | 0 | 0 | 0 | 0 | 0 | 0 | 0 |
| | Post | 8 | 0 | 0 | $0^c$ | $0^d$ | 80 | 0 | $15^c$ | $0^b$ | $0^d$ |

Vigor Rating:
$a$ = Severe injury — Plants will eventually die
$b$ = Moderate injury — Plants may or may not recover
$c$ = Moderate injury — Plants will recover
$d$ = Slight injury — Plants only slightly behind control
No Exponent — No injury — Plants similar to untreated control

What is claimed is:

1. A process for controlling growth of undesirable weeds amongst crop plants which comprises applying to the locus thereof a herbicidally effective amount of an N-($C_{2-4}$ haloacyl) oxazolidine alkylated in the 2-position with at least one $C_{1-12}$ alkyl group and having the 4 and 5 carbon atom valences satisfied by hydrogen atoms or $C_{1-6}$ alkyl groups.

2. The process of claim 1 wherein the haloacyl is chloroacyl.

3. The process of claim 1 wherein the oxazolidine is 3-($\alpha$-chloroacetyl)-2-propyl-2,4-dimethyl-oxazolidine.

4. The process of claim 1 wherein the oxazolidine is 3-($\alpha$-chloroacetyl)-2-pentyl-4,4-dimethyl-oxazolidine.

5. The process of claim 1 wherein the oxazolidine is 3-($\alpha$-chloroacetyl)-2-propyl-2,5-dimethyl-oxazolidine.

6. The process of claim 1 wherein the oxazolidine is 3-($\alpha$-chloroacetyl)-2-(2',6'-dimethylheptyl)-4,4-dimethyl-oxazolidine.

* * * * *

UNITED STATES PATENT OFFICE
CERTIFICATE OF CORRECTION

PATENT NO. : 3,884,671
DATED : May 20, 1975
INVENTOR(S) : James A. Albright and Kenneth P. Dorschner It is certified that error appears in the above-identified patent and that said Letters Patent are hereby corrected as shown below:

Column 1, lines 16 through 24, please correct the internal numbering of the chemical ring depicted to read as follows:

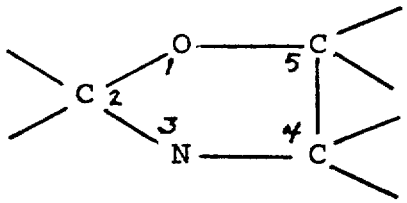

Column 1, line 59, after the word "achieving" change the word [herbicides] to read herbicidal.

Column 5, line 2, before the word "chloride" delete [oxazolidine] and add in its place chloroacetyl.

Column 7, line 55, after the word "inactive" and before the word "against" delete [,] and add in its place -- . It is seen that compounds disubstituted with identical alkyl groups at the 2-positions are considerably less active--

Table 1, Example 1, under column headed "Barynyard Grass," change [9ª] to read 90.

Signed and Sealed this

[SEAL]

seventh Day of October 1975

Attest:

RUTH C. MASON
Attesting Officer

C. MARSHALL DANN
Commissioner of Patents and Trademarks

Disclaimer 3,884,671.—*James A. Albright*, St. Louis, Mich. and *Kenneth P. Dorschner*, Vienna, Va. HERBICIDAL N-HALOACYL (2-ALKYLATED) OXAZOLIDINES. Patent dated May 20, 1975. Disclaimer filed Jan. 21, 1977, by the assignee, *SCM Corporation*.

Hereby enters this disclaimer to claim 3 of said patent.

[*Official Gazette March 22, 1977.*]